US010696283B2

(12) United States Patent
Nagel et al.

(10) Patent No.: US 10,696,283 B2
(45) Date of Patent: Jun. 30, 2020

(54) ELECTROMECHANICAL BRAKE BOOSTER AND BRAKE SYSTEM

(71) Applicant: Robert Bosch GmbH, Stuttgart (DE)

(72) Inventors: Willi Nagel, Remseck/Hochdorf (DE); Daniel Weissinger, Korntal-Muenchingen (DE); Giammaria Panunzio, Ludwigsburg (DE); Andre Bollwerk, Steinheim an der Murr (DE)

(73) Assignee: Robert Bosch GmbH, Stuttgart (DE)

( * ) Notice: Subject to any disclaimer, the term of this patent is extended or adjusted under 35 U.S.C. 154(b) by 28 days.

(21) Appl. No.: 15/759,402

(22) PCT Filed: Jul. 18, 2016

(86) PCT No.: PCT/EP2016/067006
§ 371 (c)(1),
(2) Date: Mar. 12, 2018

(87) PCT Pub. No.: WO2017/045804
PCT Pub. Date: Mar. 23, 2017

(65) Prior Publication Data
US 2018/0251115 A1    Sep. 6, 2018

(30) Foreign Application Priority Data

Sep. 14, 2015   (DE) .......................... 10 2015 217 522

(51) Int. Cl.
*B60T 13/74* (2006.01)
*B60T 11/18* (2006.01)
(Continued)

(52) U.S. Cl.
CPC ............. *B60T 13/745* (2013.01); *B60T 7/02* (2013.01); *B60T 7/042* (2013.01); *B60T 11/18* (2013.01);
(Continued)

(58) Field of Classification Search
CPC ............................... B60T 7/042; B60T 13/745
(Continued)

(56) References Cited

U.S. PATENT DOCUMENTS 4,531,419 A * 7/1985 Botz ...................... B60T 13/745
60/545
6,056,090 A * 5/2000 Reimann ............... B60T 13/741
188/156
(Continued)

FOREIGN PATENT DOCUMENTS

CN    102164794 A    8/2011
CN    203005406 U    6/2013
(Continued)

OTHER PUBLICATIONS

International Search Report dated Sep. 28, 2016, of the corresponding International Application PCT/EP2016/067006 filed Jul. 18, 2016.

*Primary Examiner* — Michael Leslie
(74) *Attorney, Agent, or Firm* — Norton Rose Fulbright US LLP; Gerard A. Messina

(57) ABSTRACT

An electromechanical brake booster for a motor vehicle, at least one support element being fastened on a gear unit housing bottom of the gear unit, which extends along its respective longitudinal axis, a bearing device being situated on the spindle, which supports the spindle on the least one support element in such away that the bearing device is able to guide the spindle, which is set into translatory motion, at a distance from the first support element along the at least one support element. A brake system is also described.

13 Claims, 5 Drawing Sheets

(51) Int. Cl.
*B60T 11/20* (2006.01)
*B60T 7/02* (2006.01)
*B60T 17/22* (2006.01)
*B60T 7/04* (2006.01)
*F16H 25/20* (2006.01)

(52) U.S. Cl.
CPC ............ *B60T 11/20* (2013.01); *B60T 17/221* (2013.01); *F16H 25/20* (2013.01); *F16H 2025/2046* (2013.01); *F16H 2025/2068* (2013.01); *F16H 2025/2081* (2013.01)

(58) Field of Classification Search
USPC .................................................... 60/538, 545
See application file for complete search history.

(56) References Cited

U.S. PATENT DOCUMENTS

| | | | |
|---|---|---|---|
| 9,108,610 B2 * | 8/2015 | Philippe | ............... B60T 13/745 |
| 2010/0002083 A1 | 1/2010 | Takenaka et al. | |
| 2012/0090316 A1 * | 4/2012 | Philippe | ............... B60T 13/745 |
| | | | 60/545 |
| 2014/0090371 A1 | 4/2014 | Yoshizu et al. | |
| 2019/0047531 A1 * | 2/2019 | Nagel | ................... B60T 13/745 |
| 2019/0047532 A1 * | 2/2019 | Ohm | ..................... B60T 13/745 |
| 2019/0152462 A1 * | 5/2019 | Panunzio | .................. B60T 7/02 |

FOREIGN PATENT DOCUMENTS

| | | |
|---|---|---|
| DE | 102005018649 A1 | 10/2006 |
| DE | 102012205611 A1 | 10/2013 |
| DE | 102012014361 A1 | 1/2014 |
| DE | 102014202568 A1 | 8/2015 |
| EP | 2292483 A1 | 3/2011 |
| FR | 2947228 A1 | 12/2010 |
| JP | 2000027665 A | 1/2000 |
| WO | 2011/147609 A1 | 12/2011 |
| WO | 2014012702 A1 | 1/2014 |

* cited by examiner

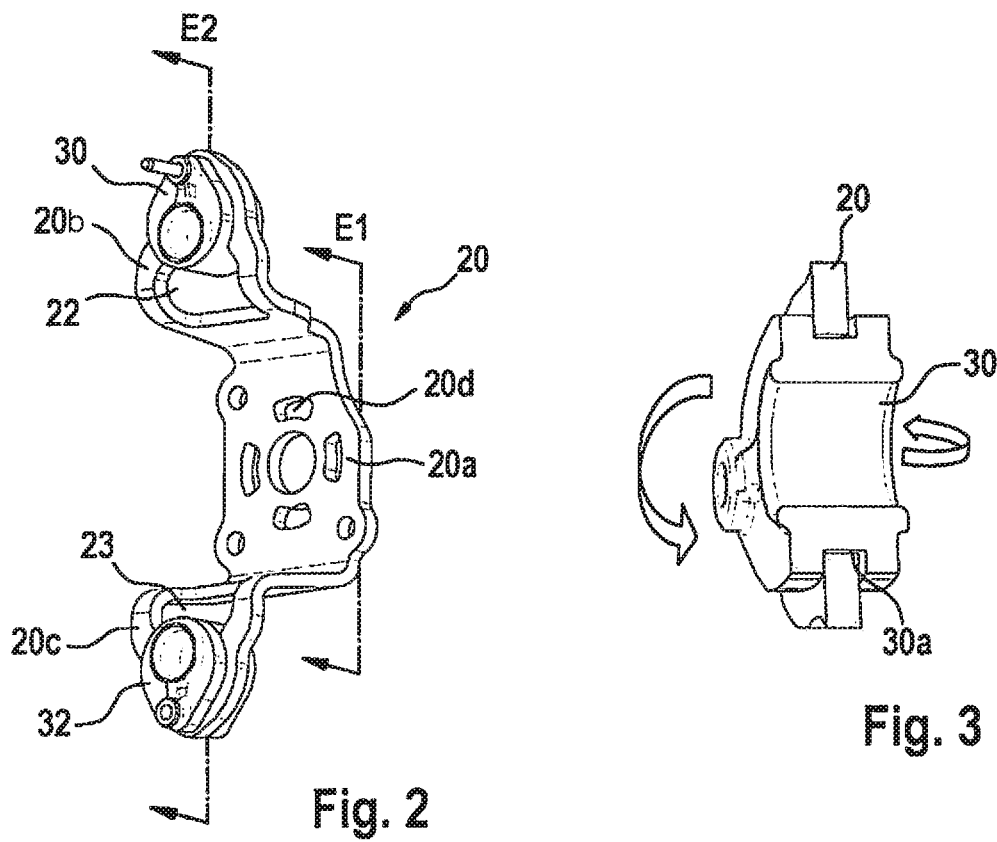
Fig. 2
Fig. 3
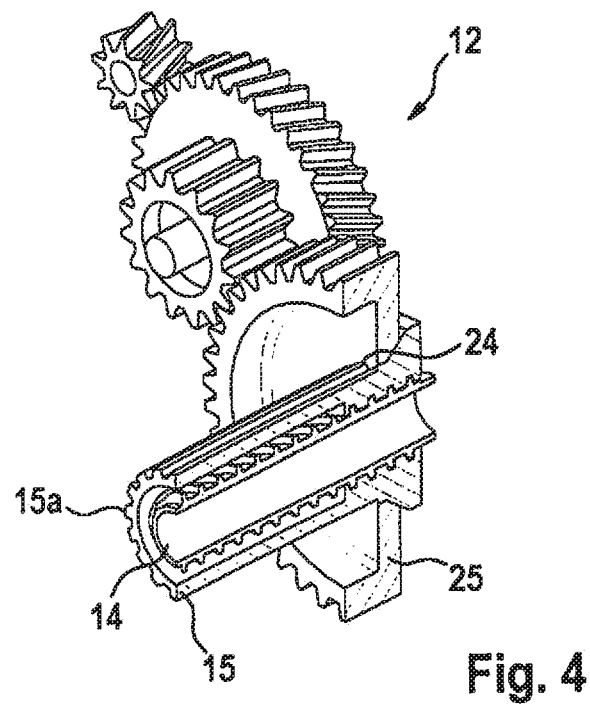
Fig. 4

ELECTROMECHANICAL BRAKE BOOSTER AND BRAKE SYSTEM

FIELD

The present invention relates to an electromechanical brake booster for a motor vehicle. The present invention further relates to a brake system.

BACKGROUND INFORMATION

Future drive concepts of motor vehicles require alternative brake pressure buildup devices since little or no vacuum is available in order to operate a conventional vacuum brake booster. Electric motor brake boosters were developed for this purpose.

German Patent Application No. DE 10 2012 014 361 A1 describes a control device for a master brake cylinder of a motor vehicle, comprising a housing to be situated between the master brake cylinder and a brake pedal, through which a pressure organ for controlling a control piston of the master brake cylinder runs, an electric motor, a worm, which is driven by the electric motor and which intersects the pressure organ, and a gear unit situated in the housing, which couples the worm with the control piston so as to translate a rotary motion of the worm into a translatory motion of the control piston.

During an operation of the electromechanical brake booster, a tilting effect occurs between an input rod, a spindle and a booster piston due to a generation of transverse forces and torque influences.

SUMMARY

The present invention provides an improved electromechanical brake booster, which allows for an optimized support of the spindle of the electromechanical brake booster that is able to compensate for transverse forces and torque influences.

In accordance with an example embodiment of the present invention, an electromechanical brake booster for a motor vehicle is provided, at least one support element being fastened on a housing bottom of the gear unit, which extends along its respective longitudinal axis, a bearing device being situated on the spindle, which supports the spindle on the at least one support element in such a way that the bearing device is able to guide the spindle, which is set into translatory motion, at a distance from the first support element along the at least one support element.

The present invention furthermore provides an example brake system having an electromechanical brake booster and a master brake cylinder, which is operable by the electromechanical brake booster.

In accordance with the present invention, a tilting effect of the spindle occurring during an operation of the electromechanical brake booster is compensated for by providing the bearing device, which supports the spindle of the electromechanical brake booster on the at least one support element. The bearing device thus allows the spindle to be guided along an adjusting axis that is situated parallel to a longitudinal axis of the at least one support element.

Advantageous specific embodiments and developments of the present invention are described herein with reference to the figures.

Another preferred development of the present invention includes providing a first support element and a second support element to be fastened on the housing bottom of the gear unit, which support elements extend along their respective longitudinal axis, and the bearing device disposed on the spindle supporting the spindle on the first support element and on the second support element. By bearing the spindle on both the first support element and the second support element, it is possible effectively to compensate for a tilting effect occurring on the spindle so that the adjusting axis of the spindle runs in a straight line and parallel to the longitudinal axis of the first and second support elements.

Another preferred development of the present invention provides for the bearing device to have a first opening, in which a first sliding bearing is inserted, which embraces the first support element, and which has a second opening, in which a second sliding bearing is inserted, which embraces the second support element, the spindle being supported by the bearing device so as to be shiftable along the first support element and the second support element. Providing the first sliding bearing and the second sliding bearing thus makes it possible to provide an efficient, low-friction bearing for the spindle on the first support element and the second support element.

Another preferred development of the present invention provides for the bearing device to have a center section, a first end section and a second end section, the bearing device being designed to have a cranked shape so that the center section in the installed state of the bearing device is situated in a first plane that is perpendicular to an adjusting axis of the spindle, and the first end section and the second end section of the bearing device being at least partially situated in a second plane at a distance from the first plane, which is perpendicular to the adjusting axis of the spindle. The cranked design of the bearing device thus advantageously makes it possible to provide additional space between the bearing device and a valve body situated adjacent to the bearing device.

Another preferred development of the present invention provides for the first sliding bearing to guide the spindle along the first support element, the second sliding bearing being supported in float-mounted fashion on the second support element in the transverse direction with respect to the longitudinal axis of the second support element. It is thus advantageously possible to shift the spindle in the axial direction along the first support element and the second support element by way of the bearing device, without a risk of the first and/or second sliding bearing becoming jammed.

Another preferred development of the present invention provides for the spindle in one operating state of the electromechanical brake booster to have a tilting angle with respect to the first support element and/or the second support element, the first sliding bearing and the second sliding bearing being designed to adapt to the tilting angle. Thus, it is possible for the bearing device to compensate for tilting angles caused by the application of transverse forces and/or torque influences on the spindle.

Another preferred development of the present invention provides for a nut of the spindle to have, on an outer circumference, a multi-toothed profile and to be shiftably supported on a multi-toothed hub of a toothed wheel of the gear unit along the adjusting axis of the spindle. Thus, in the event of a failure of the electromechanical brake booster, it is possible for the spindle nut together with the spindle to be shifted in an adjusting direction of the spindle without working against a resistance of the electric motor or the gear unit.

Another preferred development of the present invention provides for the first sliding bearing to be inserted into the first opening of the bearing device by a groove developed circumferentially on an outer circumference of the first sliding bearing, a gap being developed between the bearing device and the groove, and the first sliding bearing being supported in the groove so as to be able to rotate and tilt relative to the bearing device about an axis situated parallel to the first end section and the second end section. In the event that the spindle and the bearing device that is rigidly connected to the spindle tilt, as a result of tolerances for example, the sliding bearing is thus able to compensate for the tilting of the spindle by tilting in the groove relative to the bearing device such that the bearing device is able to guide the spindle along the first and second support elements without jamming.

Another preferred development of the present invention provides for a front side of the spindle nut to be a common stop of the bearing device and of finger elements that connect an input rod, a plunger situated in the hollow spindle that is operable by the input rod, and a fastening plate situated on the plunger to one another. Thus, it is advantageously possible to provide a common stop of the bearing device and the finger elements on the front side of the spindle nut. It is thus possible for the bearing device and the finger elements to support themselves with very high forces on the stop.

Another preferred development of the present invention provides for the finger elements to reach through holes developed in the bearing device and to be secured against twisting together with the fastening plate. Thus, it is possible advantageously to align the finger elements and the fastening plate and to secure them against twisting even when there is an influence of forces directed in the radial direction.

Another preferred development of the present invention provides for the first sliding bearing and the second sliding bearing to be made from plastic, in particular polyoxymethylene or polyamide, and to be suitable for a plastic/steel friction pairing. Thus it is possible to ensure a low-friction and low-wear bearing or guidance of the sliding bearing along the support elements.

The example embodiments and developments of the present invention may be combined with one another as desired.

Additional possible embodiments, developments and implementations of the present invention also include combinations of features of the present invention that are not explicitly mentioned above or below with respect to the exemplary embodiments.

BRIEF DESCRIPTION OF THE DRAWINGS

The figures are intended to provide a better understanding of the specific embodiments of the present invention. They illustrate specific embodiments and serve to explain main features of the present invention in connection with the description herein.

Other specific embodiments and many of the mentioned advantages result with regard to the figures. The represented elements of the drawings are not necessarily drawn to scale with respect to one another.

FIG. 2 shows a perspective representation of a bearing device of the electromechanical brake booster for the motor vehicle according to the preferred specific embodiment of the present invention.

FIG. 3 shows a cross-sectional representation of a sliding bearing of the bearing device of the electromechanical brake booster for the motor vehicle according to the preferred specific embodiment of the present invention.

FIG. 4 shows a perspective representation of the gear unit and the spindle of the electromechanical brake booster for the motor vehicle according to the preferred specific embodiment of the present invention.

Unless indicated otherwise, identical reference symbols in the figures indicate identical or functionally equivalent elements, parts or components.

DETAILED DESCRIPTION OF EXAMPLE EMBODIMENTS

Figure 1:
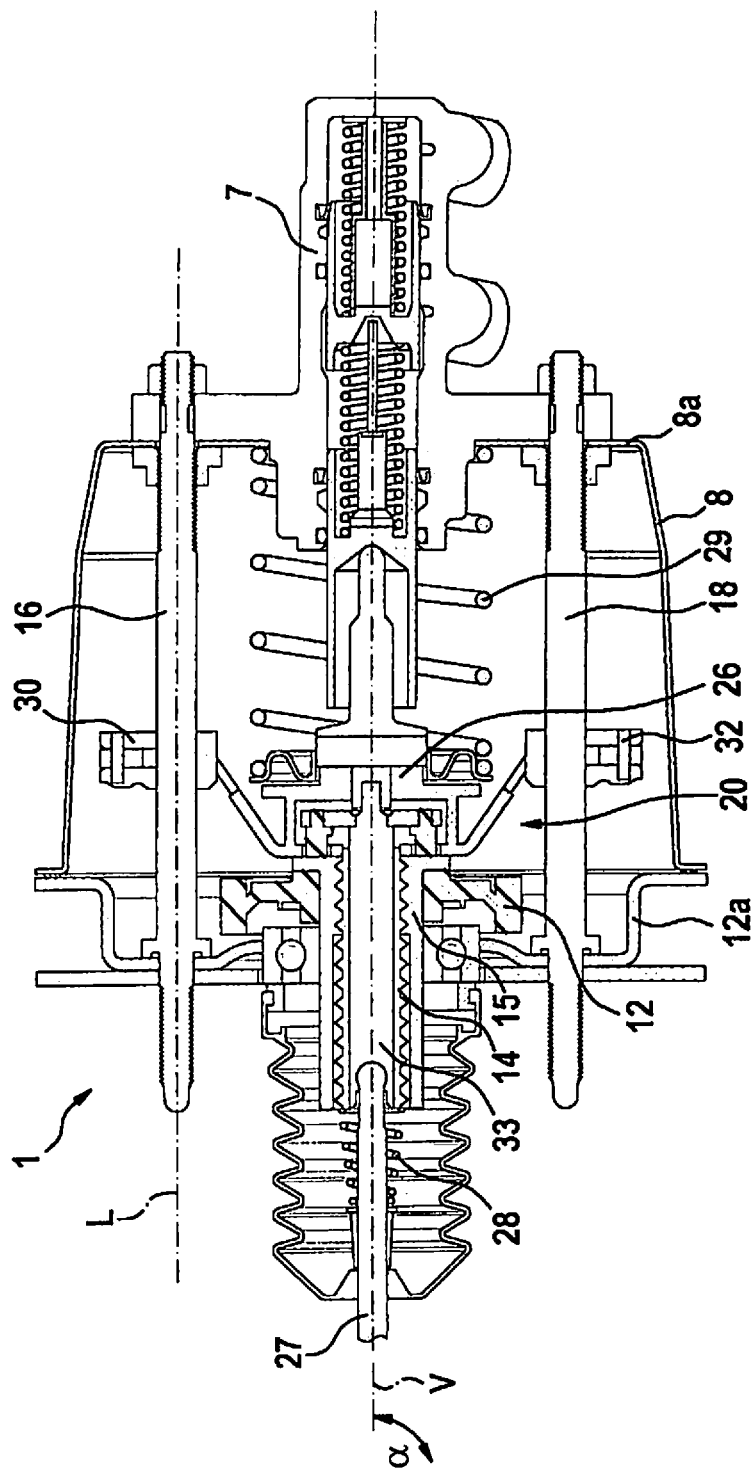
FIG. 1 shows a longitudinal sectional view of an electromechanical brake booster for a motor vehicle according to a preferred specific embodiment of the present invention.

FIG. 1 shows a longitudinal sectional view of an electromechanical brake booster 1 for a motor vehicle according to a preferred specific embodiment of the present invention.

The electromechanical brake booster 1 has an electric motor (not shown in FIG. 1), which is operatively connected to a spindle 14 via a gear unit 12 in such a way that a rotation of a rotor of the electric motor effects a translatory motion of the spindle. A first support element 16 and a second support element 18 are fastened on a gear unit housing bottom 12a of the gear unit 12. First support element 16 and second support element 18 extend along their respective longitudinal axes L.

A bearing device 20 is situated on spindle 14, which supports spindle 14 on first support element 16 and second support element 18 in such a way that bearing device 20 is able to guide the spindle 14 set into the translatory motion at a distance from the first support element along the at least one support element.

First support element 16 and second support element 18 are preferably formed by a tie rod. Alternatively, first support element 16 and second support element 18 may be formed by a pipe having an inner through bolt. The tie rod or alternatively the pipe having an inner through bolt are preferably made of steel. A housing 8 of electromechanical brake booster 1 is preferably made of sheet steel. An input rod 27 is preferably designed to operate a plunger 33. Plunger 33 is preferably situated in a shiftable manner in spindle 14 developed as a hollow spindle.

Bearing device 20 is preferably welded to spindle 14. Alternatively, bearing device 20 may also be developed in one piece with spindle 14 or be connected in another manner. On a side of bearing device 20 opposite spindle 14, bearing device 20 is preferably connected or developed with a valve body 26.

A restoring spring 29 is disposed between valve body 26 and a master brake cylinder 7 situated on an end section of housing 8. Restoring spring 29 is preferably designed to exert a restoring force on spindle 14.

Bearing device 20 is preferably designed to compensate for a tilting effect between the input rod, the spindle and the booster piston occurring in an operation of electromechanical brake booster 1 due to transverse forces acting on the spindle. Bearing device 20 is thus advantageously able to compensate for a tilting angle a between adjusting axis V of spindle 14 and longitudinal axis L of first support element 16 and second support element 18.

Bearing device 20 preferably has openings on respective end sections, into which sliding bearings are inserted. A first sliding bearing 30 is inserted on a first end section of bearing device 20. A second sliding bearing 32 is preferably inserted on a second end section of bearing device 20. Spindle 14 is thus supported on first support element 16 and second support element 18 by first sliding bearing 30 and second sliding bearing 32. First sliding bearing 30 guides spindle 14 preferably along first support element 16. Second sliding bearing 32 is preferably float-mounted on second support element 18 in the transverse direction with respect to longitudinal axis L of second support element 18.

First support element 16 and/or second support element 18 have a tilting angle α with respect to adjusting axis V of spindle 14 when transverse forces are applied for example. First sliding bearing 30 and second sliding bearing 32 are advantageously designed to adapt to tilting angle α and thereby to compensate for the latter.

FIG. 2 shows a perspective representation of a bearing device 20 of the electromechanical brake booster 1 for the motor vehicle according to the preferred specific embodiment of the present invention.

Bearing device 20 preferably has a first opening or oblong hole 22 and a second opening or oblong hole 23. A first sliding bearing 30 is preferably inserted into first opening 22, which embraces first support element 16 (not shown in FIG. 2). A second sliding bearing 32 is preferably inserted into second opening 23, which embraces second support element 18 (not shown in FIG. 2). Bearing device 20 thus advantageously supports the spindle (not shown in FIG. 2) so that it is able to slide along the first support element and the second support element.

Bearing device 20 preferably has a center section 20a, a first end section 20b and a second end section 20c. Bearing device 20 is preferably designed in a cranked shape so that the center section 20a in the installed state of bearing device 20 is situated in a first plane E1 that is perpendicular to the adjusting axis (not shown in FIG. 2) of the spindle. First end section 20b and second end section 20c of bearing device 20 are partially situated in a second plane E2 that is perpendicular to the adjusting axis (not shown in FIG. 2) of the spindle.

First sliding bearing 30 and second sliding bearing 32 are preferably made of plastic, in particular polyoxymethylene. Alternatively, first sliding bearing 30 and second sliding bearing 32 may be made of another suitable plastic, for example polyamide. First sliding bearing 30 and second sliding bearing 32 are furthermore suitable for a plastic/steel friction pairing.

First sliding bearing 30 and second sliding bearing 32 preferably have a round bore for receiving the respective first support element 16 and the second support element 18 in order to ensure an optimized contact pressure. Bearing device 20 is designed in a cranked shape, as described above, in order to increase a distance between sliding bearings 30, 32 and spindle nut 15. At the same tolerance value, a greater distance advantageously results in a smaller tilting angle of the spindle 14 with respect to spindle nut 15.

FIG. 3 shows a cross-sectional representation of a sliding bearing 30 of bearing device 20 of electromechanical brake booster 1 for the motor vehicle according to the preferred specific embodiment of the present invention. Sliding bearing 30 is advantageously inserted into opening 22 of bearing device 20 by a groove 30a developed circumferentially on an outer circumference of first sliding bearing 30.

A gap is preferably developed between bearing device 20 and groove 30a so that sliding bearing 30 is supported in groove 30a in such a way that it is able to rotate and tilt about second plane E2 relative to bearing device 20.

In the event that spindle 14 (shown in FIG. 1) and bearing device 20, which is rigidly connected to the spindle, tilt, as a result of tolerances for example, sliding bearing 30 is thus able to compensate for the tilting of spindle 14 by tilting in grove 30a relative to bearing device 20 such that bearing device 20 is able to guide spindle 14 along the first and second support element 16, 18 without jamming.

FIG. 4 shows a perspective representation of gear unit 12 and spindle 14 of electromechanical brake booster 1 for the motor vehicle according to the preferred specific embodiment of the present invention. Spindle nut 15 of spindle 14 preferably has a multi-tooth profile on an outer circumference 15a. Spindle nut 15 of spindle 14 is furthermore preferably supported in a multi-toothed hub 24 of a toothed wheel 25 of gear unit 12 so as to be shiftable in an adjusting direction of spindle 14. Spindle nut 15 of spindle 14 is thus able to be shifted without force along its axis of adjusting in the event of a failure of electromechanical brake booster 1.

Figure 5:
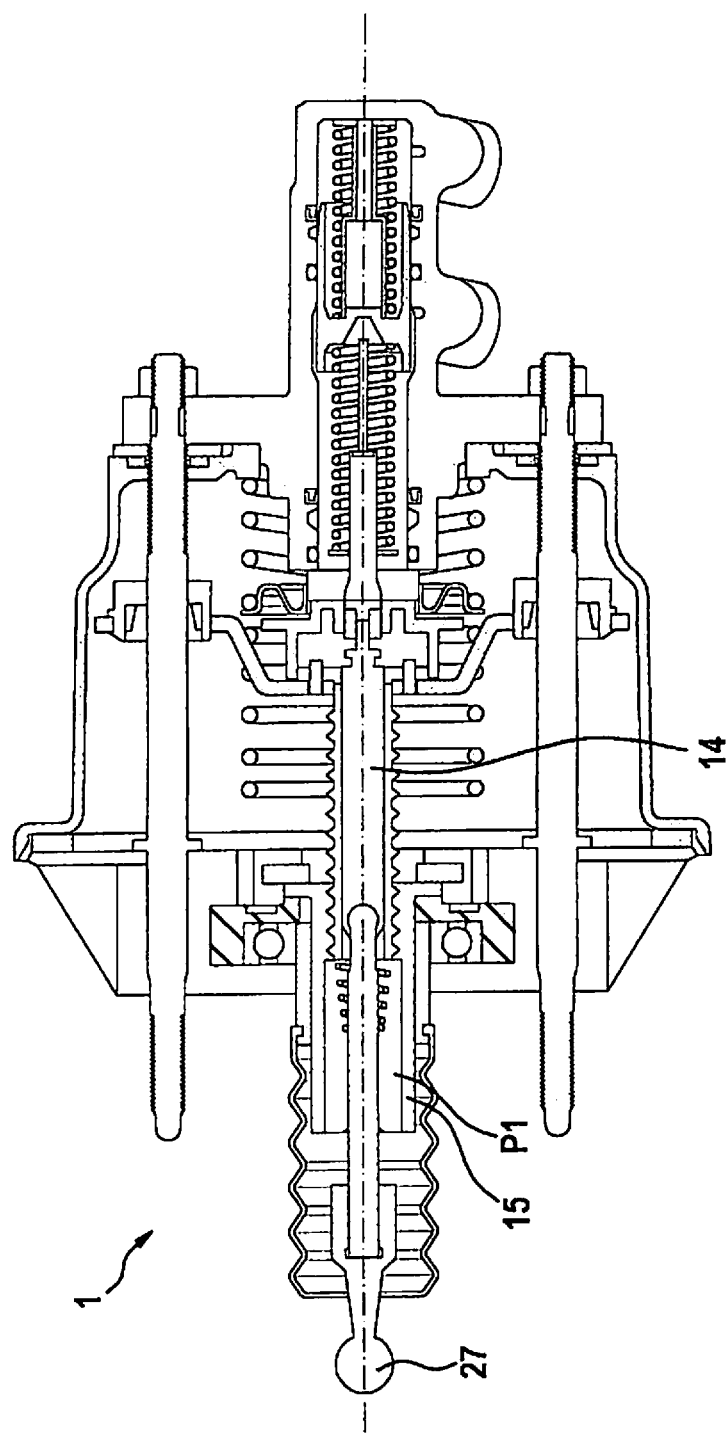
FIG. 5 shows a longitudinal sectional view of the electromechanical brake booster for the motor vehicle according to the preferred specific embodiment of the present invention.

FIG. 5 shows a longitudinal sectional view of the electromechanical brake booster for the motor vehicle according to the preferred specific embodiment of the present invention. In the present representation, spindle nut 15 is shown in normal operation of electromechanical brake booster 1. In the present representation, spindle 14 has its maximum excursion.

Figure 6:
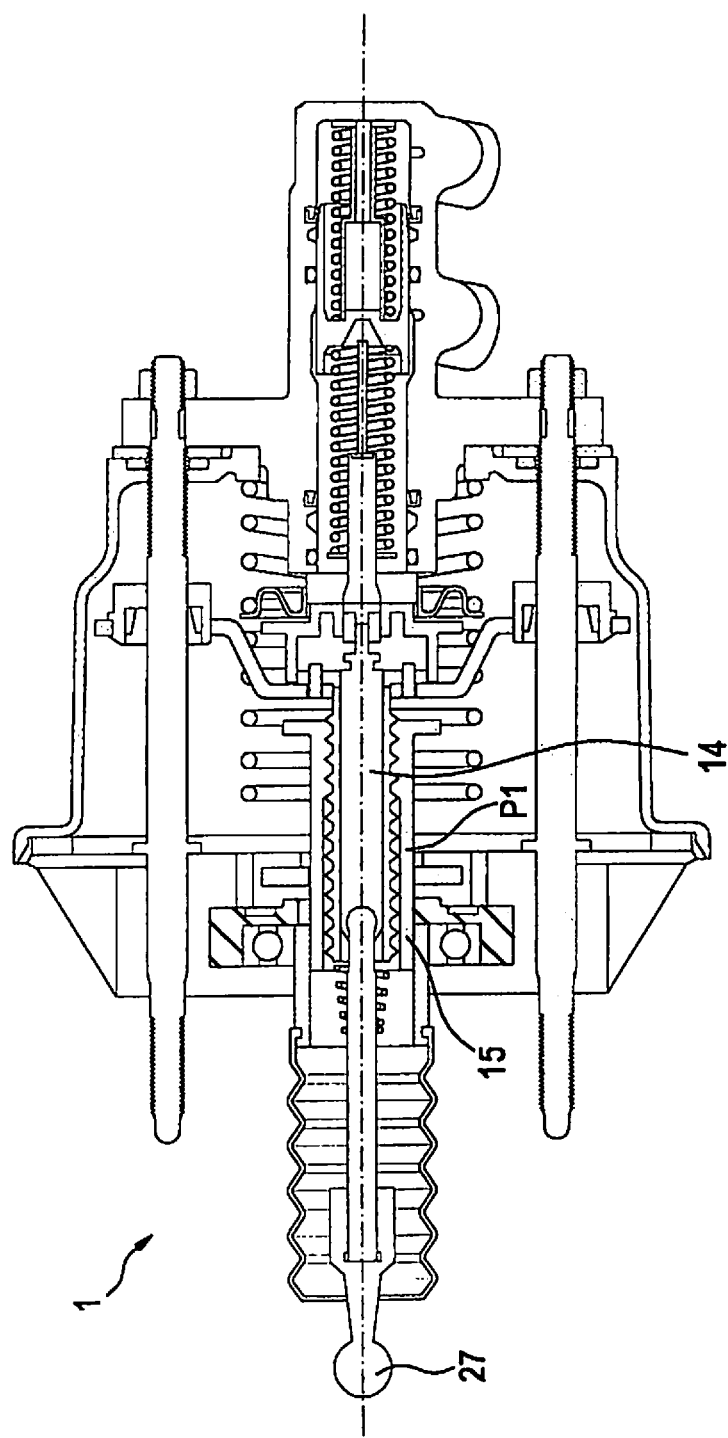
FIG. 6 shows a longitudinal sectional view of the electromechanical brake booster for the motor vehicle according to the preferred specific embodiment of the present invention.
Figure 7:
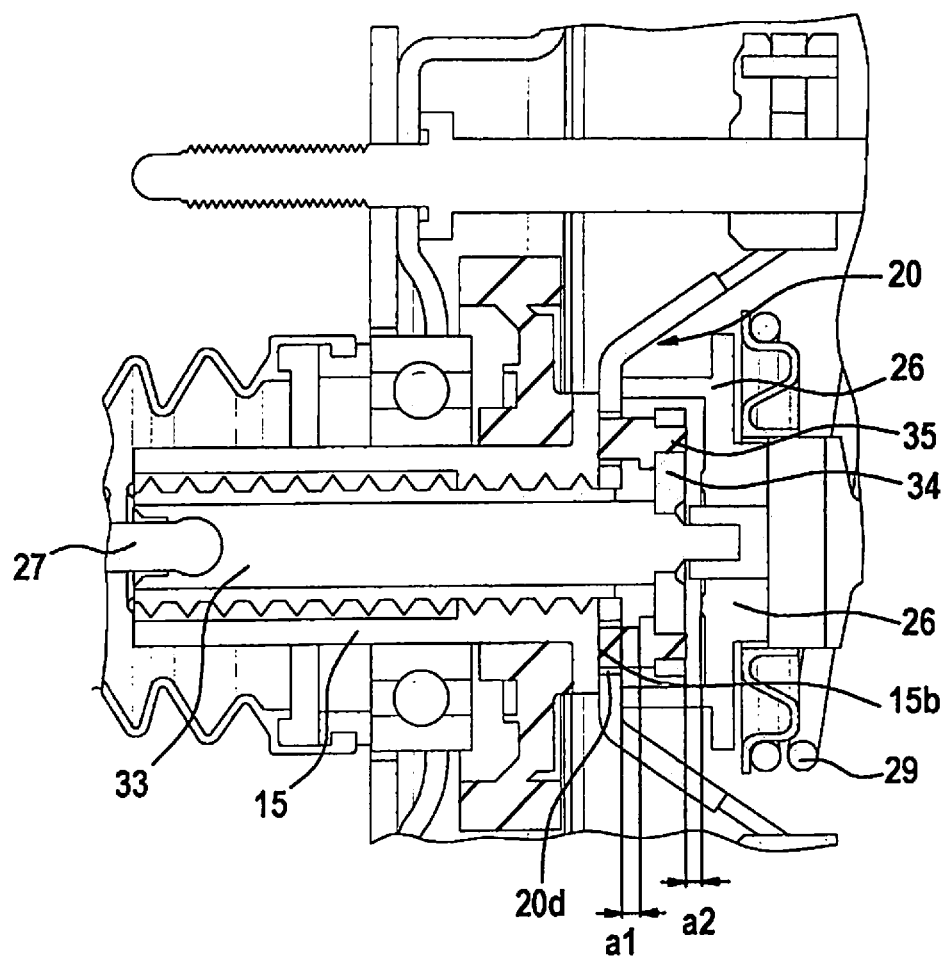
FIG. 7 shows an enlarged detailed view of the longitudinal sectional view of the electromechanical brake booster for the motor vehicle according to the preferred specific embodiment of the present invention.

FIG. 6 shows a longitudinal sectional view of electromechanical brake booster 1 for the motor vehicle according to the preferred specific embodiment of the present invention. In the present representation, electromechanical brake booster 1 is shown in a push-through mode, in which an electromechanical support of a braking force generated by the driver is not provided due to a failure of electromechanical brake booster 1. In the push-through mode, the driver thus operates the master cylinder solely by a manually generated braking force. According to the present specific embodiment, in the push-through mode, spindle nut 15 is shifted together with spindle 14 axially in the adjusting direction of spindle 14 by operating input rod 27. FIG. 7 shows an enlarged detailed view of the longitudinal sectional view, shown in FIG. 1, of the electromechanical brake booster 1 for the motor vehicle according to the preferred specific embodiment of the present invention.

A front side 15b of spindle nut 15 is preferably a common stop of bearing device 20 and of finger elements 35, which interconnect input rod 27, a plunger 33 situated in the hollow spindle 14, which is operable by input rod 27, and a fastening plate 34 situated on plunger 33. Finger elements 35 furthermore reach preferably through holes 20d developed in bearing device 20 and are secured against twisting together with fastening plate 34. Valve body 26 in turn is connected to bearing device 20 in a rotationally and axially fixed manner. In the present exemplary embodiment, finger elements 35 have clips or clamps, which may be pushed through openings 20d developed in bearing device 20. The restoring spring (not shown in FIG. 7) acts on bearing device 20 and presses the latter against the stop on the front side 15b of spindle nut 15. The spring element 28 (not shown in FIG. 7), which is situated in the area of input rod 27, presses finger elements 35 from the other side against the stop on the front side 15b of spindle nut 15.

Bearing device 20, valve body 26 and spindle 14 are preferably connected to one another and forma unit. Plunger 33, fastening plate 34 and finger elements 35 are preferably likewise connected to one another and form an additional unit.

The additional unit made up of plunger 33, fastening plate 34 and finger elements 35 is axially shiftable in spindle 14 developed as a hollow spindle. The additional unit is preferably shiftable from an initial position shown in FIG. 7 counter to an operating direction of spindle 14 in an area of a gap a1. The additional unit moreover is preferably shiftable from an initial position shown in FIG. 7 in the operating direction of spindle 14 in an area of a gap a2.

In the initial position of the additional unit shown in FIG. 7, without pedal force of the driver, gaps a1 and a2 are of equal size and fastening plate 34 is situated in the middle. Fastening plate 34, finger elements 34 and bearing device 20 have the front side 15b of spindle nut 15 as their common stop, on which they are respectively alignable.

Although the present invention is described above with reference to preferred exemplary embodiments, it is not limited to these, but rather may be modified in numerous ways. In particular, the present invention may be changed or modified in many ways without deviating from the essence of the present invention.

The bearing device may also have another suitable shape, for example, or be made from another suitable material. Furthermore, the sliding bearings may be fastened on the bearing device in a different manner for example.

LIST OF REFERENCE SYMBOLS 1 brake booster
7 brake cylinder
8 housing
12 gear unit
12a gear unit housing bottom
14 spindle
15 spindle nut
15a outer circumference of the spindle nut
15b front side of the spindle nut
16 first support element
18 second support element
20 bearing device
20a center section
20b first end section
20c second end section
20d holes
22 opening
23 opening
24 multi-toothed hub
25 toothed wheel
26 valve body
27 input rod
28 spring element
29 restoring spring
30 first sliding bearing
32 second sliding bearing
33 plunger
34 fastening plate
35 finger elements
40 additional bearing device
α tilting angle
a1, a2 distance
L longitudinal axis
V adjusting axis
E1 first plane
E2 second plane

What is claimed is:

1. An electromechanical brake booster for a motor vehicle, comprising:
   an electric motor operatively connected to a spindle via a gear unit in such a way that a rotation of a rotor of the electric motor effects a translatory motion of the spindle;
   at least one support element fastened on a gear unit housing bottom of the gear unit, which extends along its respective longitudinal axis; and
   a bearing device situated on the spindle, which supports the spindle on the at least one support element in such a way that the bearing device is able to guide the spindle, which is set into translatory motion, at a distance from a first support element along the at least one support element, wherein a spindle nut of the spindle has a multi-toothed profile on an outer circumference and is supported in a multi-toothed hub of a toothed wheel of the gear unit so as to be shiftable along the adjusting axis of the spindle.

2. The electromechanical brake booster as recited in claim 1, wherein the at least one support element includes a first support element and a second support element which are fastened on the gear unit housing bottom of the gear unit, which support elements extend along their respective longitudinal axis, and the bearing device situated on the spindle supports the spindle on the first support element and on the second support element.

3. The electromechanical brake booster as recited in claim 2, wherein the bearing device has a first opening, in which a first sliding bearing is inserted, which embraces the first support element, and which has a second opening, in which a second sliding bearing is inserted, which embraces the second support element, the spindle being supported by the bearing device so as to be shiftable along the first support element and the second support element.

4. The electromechanical brake booster as recited in claim 2, wherein the bearing device has a center section, a first end section and a second end section, the bearing device being designed in a cranked shape in such a way that the center section in the installed state of the bearing device is situated in a first plane that is perpendicular to an adjusting axis of the spindle, and the first end section and the second end section of the bearing device being at least partially situated in a second plane at a distance from the first plane, which is perpendicular to the adjusting axis of the spindle.

5. The electromechanical brake booster as recited in claim 1, wherein a front side of the spindle nut is a common stop of the bearing device and of finger elements, wherein the spindle is a hollow spindle and a plunger is situated in the hollow spindle, which is operable by the input rod, and wherein a fastening plate is situated on the plunger, wherein the finger elements interconnect an input rod, the plunger, and the fastening plate.

6. The electromechanical brake booster as recited in claim 5, wherein the finger elements reach through holes developed in the bearing device and are secured against twisting together with a fastening plate.

7. An electromechanical brake booster for a motor vehicle, comprising:
   an electric motor operatively connected to a spindle via a gear unit in such a way that a rotation of a rotor of the electric motor effects a translatory motion of the spindle;

at least one support element fastened on a gear unit housing bottom of the gear unit, which extends along its respective longitudinal axis; and a bearing device situated on the spindle, which supports the spindle on the at least one support element in such a way that the bearing device is able to guide the spindle, which is set into translatory motion, at a distance from a first support element along the at least one support element, wherein:

the at least one support element includes a first support element and a second support element which are fastened on the gear unit housing bottom of the gear unit, which support elements extend along their respective longitudinal axis, and the bearing device situated on the spindle supports the spindle on the first support element and on the second support element, and a first sliding bearing guides the spindle along the first support element, a second sliding bearing being slidingly-mounted on the second support element in a transverse direction to the longitudinal axis of the second support element.

8. An electromechanical brake booster for a motor vehicle, comprising:

an electric motor operatively connected to a spindle via a gear unit in such a way that a rotation of a rotor of the electric motor effects a translatory motion of the spindle;

at least one support element fastened on a gear unit housing bottom of the gear unit, which extends along its respective longitudinal axis; and a bearing device situated on the spindle, which supports the spindle on the at least one support element in such a way that the bearing device is able to guide the spindle, which is set into translatory motion, at a distance from a first support element along the at least one support element, wherein:

the at least one support element includes a first support element and a second support element which are fastened on the gear unit housing bottom of the gear unit, which support elements extend along their respective longitudinal axis, and the bearing device situated on the spindle supports the spindle on the first support element and on the second support element, and the spindle, due to excursion and tolerances of the spindle, has a tilting angle with respect to at least one of the first support element, and the second support element, and wherein a first sliding bearing and a second sliding bearing compensate for the tilting angle.

9. An electromechanical brake booster for a motor vehicle, comprising:

an electric motor operatively connected to a spindle via a gear unit in such a way that a rotation of a rotor of the electric motor effects a translatory motion of the spindle;

at least one support element fastened on a gear unit housing bottom of the gear unit, which extends along its respective longitudinal axis; and a bearing device situated on the spindle, which supports the spindle on the at least one support element in such a way that the bearing device is able to guide the spindle, which is set into translatory motion, at a distance from a first support element along the at least one support element, wherein:

the at least one support element includes a first support element and a second support element which are fastened on the gear unit housing bottom of the gear unit, which support elements extend along their respective longitudinal axis, and the bearing device situated on the spindle supports the spindle on the first support element and on the second support element, the bearing device has a first opening, in which a first sliding bearing is inserted, which embraces the first support element, and which has a second opening, in which a second sliding bearing is inserted, which embraces the second support element, the spindle being supported by the bearing device so as to be shiftable along the first support element and the second support element, and the first sliding bearing is inserted into the first opening of the bearing device by a groove developed circumferentially on an outer circumference of the first sliding bearing, a gap being developed between the bearing device and the groove, and the first sliding bearing being supported in the groove so as to be able to rotate and tilt relative to the bearing device about an axis situated parallel to the first end section and the second end section.

10. An electromechanical brake booster for a motor vehicle, comprising:

an electric motor operatively connected to a spindle via a gear unit in such a way that a rotation of a rotor of the electric motor effects a translatory motion of the spindle;

at least one support element fastened on a gear unit housing bottom of the gear unit, which extends along its respective longitudinal axis; and a bearing device situated on the spindle, which supports the spindle on the at least one support element in such a way that the bearing device is able to guide the spindle, which is set into translatory motion, at a distance from a first support element along the at least one support element, wherein:

the at least one support element includes a first support element and a second support element which are fastened on the gear unit housing bottom of the gear unit, which support elements extend along their respective longitudinal axis, and the bearing device situated on the spindle supports the spindle on the first support element and on the second support element, the bearing device has a first opening, in which a first sliding bearing is inserted, which embraces the first support element, and which has a second opening, in which a second sliding bearing is inserted, which embraces the second support element, the spindle being supported by the bearing device so as to be shiftable along the first support element and the second support element, and the first sliding bearing and the second sliding bearing are made of plastic, the plastic being one of polyoxymethylene or polyamide, and the plastic being adapted to achieving a plastic/steel friction pairing.

11. An electromechanical brake booster for a motor vehicle, comprising:

an electric motor operatively connected to a spindle via a gear unit in such a way that a rotation of a rotor of the electric motor effects a translatory motion of the spindle;

at least one support element fastened on a gear unit housing bottom of the gear unit, which extends along its respective longitudinal axis; and a bearing device situated on the spindle, which supports the spindle on the at least one support element in such a way that the bearing device is able to guide the spindle, which is set into translatory motion, at a distance from a first support element along the at least one support element, wherein:

the at least one support element includes a first support element and a second support element which are fastened on the gear unit housing bottom of the gear unit, which support elements extend along their respective longitudinal axis, and the bearing device situated on the spindle supports the spindle on the first support element and on the second support element, the bearing device has a first opening, in which a first sliding bearing is inserted, which embraces the first support element, and which has a second opening, in which a second sliding bearing is inserted, which embraces the second support element, the spindle being supported by the bearing device so as to be shiftable along the first support element and the second support element, and the first sliding bearing guides the spindle along the first support element, the second sliding bearing being slidingly mounted on the second support element in a transverse direction to the longitudinal axis of the second support element.

12. An electromechanical brake booster for a motor vehicle, comprising:

an electric motor operatively connected to a spindle via a gear unit in such a way that a rotation of a rotor of the electric motor effects a translatory motion of the spindle;

at least one support element fastened on a gear unit housing bottom of the gear unit, which extends along its respective longitudinal axis; and a bearing device situated on the spindle, which supports the spindle on the at least one support element in such a way that the bearing device is able to guide the spindle, which is set into translatory motion, at a distance from a first support element along the at least one support element, wherein the at least one support element includes a first support element and a second support element which are fastened on the gear unit housing bottom of the gear unit, which support elements extend along their respective longitudinal axis, and the bearing device situated on the spindle supports the spindle on the first support element and on the second support element, wherein:

the bearing device has a first opening, in which a first sliding bearing is inserted, which embraces the first support element, and which has a second opening, in which a second sliding bearing is inserted, which embraces the second support element, the spindle being supported by the bearing device so as to be shiftable along the first support element and the second support element, and the first sliding bearing is inserted into the first opening of the bearing device by a groove developed circumferentially on an outer circumference of the first sliding bearing, a gap being developed between the bearing device and the groove, and the first sliding bearing being supported in the groove so as to be able to rotate and tilt relative to the bearing device about an axis situated parallel to the first end section and the second end section.

13. An electromechanical brake booster for a motor vehicle, comprising:

an electric motor operatively connected to a spindle via a gear unit in such a way that a rotation of a rotor of the electric motor effects a translatory motion of the spindle;

at least one support element fastened on a gear unit housing bottom of the gear unit, which extends along its respective longitudinal axis; and a bearing device situated on the spindle, which supports the spindle on the at least one support element in such a way that the bearing device is able to guide the spindle, which is set into translatory motion, at a distance from a first support element along the at least one support element, wherein:

a front side of a spindle nut of the spindle is a common stop of the bearing device and of finger elements, the spindle is a hollow spindle and a plunger is situated in the hollow spindle, which is operable by an input rod, a fastening plate is situated on the plunger, and the finger elements interconnect the input rod, the plunger, and the fastening plate.

* * * * *